Figure 1:
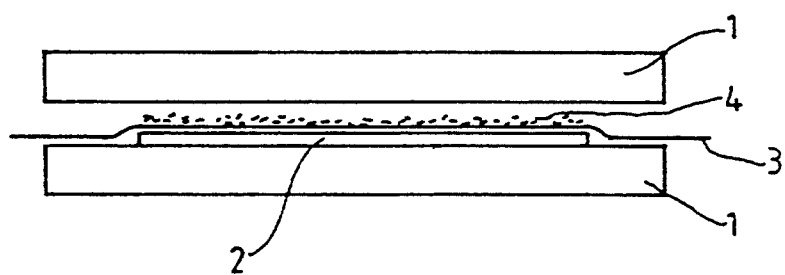

United States Patent [19]

Lühmann et al.

[11] Patent Number: 5,352,730
[45] Date of Patent: Oct. 4, 1994

[54] COATING SYSTEM FOR MATERIALS WHICH SWELL IN WATER

[75] Inventors: Erhard Lühmann, Bomlitz; Burkhard Kressdorf, Walsrode; Lutz Hoppe, Walsrode; Klaus Szablikowski, Walsrode; Gunter Weber, Fallingbostel; Sebastian Meyer-Stork, Bomlitz, all of Fed. Rep. of Germany

[73] Assignee: Wolff Walsrode AG, Walsrode, Fed. Rep. of Germany

[21] Appl. No.: 894,387

[22] Filed: Jun. 5, 1992

[30] Foreign Application Priority Data

Jun. 13, 1991 [DE] Fed. Rep. of Germany ....... 4119444

[51] Int. Cl.$^5$ .............................................. C08L 75/04
[52] U.S. Cl. ........................ 524/37; 524/42; 524/733; 536/57; 536/58; 536/63; 536/69
[58] Field of Search ......................... 524/37, 42, 733; 536/57, 58, 63, 69

[56] References Cited

U.S. PATENT DOCUMENTS

| | | |
|---|---|---|
| 4,505,778 | 3/1985 | Robertson .............. 528/76 |
| 4,931,524 | 6/1990 | Sato et al. .............. 528/76 |
| 5,140,089 | 8/1992 | Mühlfeld et al. ............ 524/733 |

FOREIGN PATENT DOCUMENTS

| | | |
|---|---|---|
| 0895927 | 3/1972 | Canada . |
| 0140537 | 9/1984 | European Pat. Off. . |
| 3705025 | 2/1987 | Fed. Rep. of Germany . |
| 1334372 | 6/1962 | France . |
| 2204156 | 6/1974 | France . |
| 2112791 | 7/1983 | United Kingdom . |

*Primary Examiner*—Maurice J. Welsh
*Attorney, Agent, or Firm*—Sprung Horn Kramer & Woods

[57] ABSTRACT

The present invention relates to a coating compound for sheets, films, or molded products composed of modified or unmodified polysaccharides.

15 Claims, 1 Drawing Sheet

COATING SYSTEM FOR MATERIALS WHICH SWELL IN WATER

The present invention relates to a coating compound for sheets, films, or moulded products composed of modified or unmodified polysaccharides.

Processes for the production of regenerated cellulose in the form of fibres or films have been known for a long time. It has also long been known that films, fibres and other moulded products can be produced from cellulose derivatives such as cellulose ethers and esters (Ullmann's 246, published by Verlag Chemie, Weinhein, 1976). Mixtures of cellulose hydrate and natural and synthetic polymers have also recently been described (see e.g. DE-A 4 002 083 and DE-A 4 009 758).

Articles which have a high use value can be obtained from these products. In particular, viscose yarns produced from regenerated cellulose, and films of cellulose hydrate (cellophane) are widely used. Cellulose hydrate films in particular only acquire their use properties by the addition of primary and secondary plasticizers, the latter including glycols, ureas, glycerol and in particular water.

These products are uncoated but not watertight and therefore not age resistant when stored under various climatic conditions.

A slight improvement in the imperviousness to water of cellulose hydrate films is obtained by lacquering. Nitro lacquers or PVDC lacquers or plastic or metal composites are generally used for this purpose (Ullmann's Encyclopedie der technischen Chemie, Volume 11, page 679, Verlag Chemie, Weinheim, 1976, DE-A 1 720 128, DE-A-1 261 033, DE-A 1 619 221, DE-A 1 720 127, DE-A 1 519 433, GB 1 050 253, DE-A 1 221 116). A substitute for PVDC lacquering would be desirable for ecological reasons. Also the films are no longer biodegradable when the above coatings and composites, and in particular the PVDC lacquers, are used.

PVDC and nitro lacquers have the disadvantage of poor adherence to the very hydrophilic cellulose surface, with the result that primers must be used, In the case of nitro lacquers, the imperviousness to water is obtained merely by using a high proportion of paraffin. Rapid breakthrough of water takes place when the thin layers are damaged, as may already occur in the processing machines due to the low degree of abrasion resistance of the layers.

These disadvantages of lacquered cellulose hydrate films limit their uses to applications in which only slight exposure to moisture or water and only slight mechanical stresses are to be expected.

It is an object of the present invention to modify unmodified and modified polysaccharide products such as those obtained from regenerated cellulose or from cellulose derivatives which swell in water or mixtures of these two groups of products and mixtures with synthetic polymers by a surface treatment so that these products will remain stable over a substantially longer period than those which have been treated according to the state of the art but remain biologically degradable and can be mineralized under conditions of compost formation. This opens up new fields of application, e.g. for articles of hygiene, packaging materials, articles for medical purposes, articles for use in the foodstuffs industry, disposal of waste material and agriculture.

The present invention relates to ecologically acceptable biologically degradable coating systems which are capable of entering into chemical and physical interaction with polysaccharide substrates, show good adherence and greatly reduce the penetration of water. This is surprisingly achieved with polyurethane coating systems, and especially with those which have a substantially higher isocyanate content than conventional polyurethane lacquers (see Comparison Examples).

The substrates are characterised in that they consist of unmodified or modified polysaccharides, in particular of regenerated cellulose or of cellulose derivatives which swell in water or of mixtures of cellulose and/or cellulose derivatives and synthetic polymers.

The coating systems are characterised in that the binder consists of at least one or more polyisocyanates A, optionally one or more hydroxyl compounds B and optionally one or more cellulose esters C and in that the NCO:OH ratio is preferably greater than 1:0.85, and is most preferably from 1:0.80 to 1:0.15.

Examples of suitable polyisocyanates include aliphatic, cycloaliphatic, araliphatic, aromatic and heterocyclic polyisocyanates.

Polyisocyanates or polyisocyanate mixtures in which all the isocyanate groups are aliphatically and/or cycloaliphatically bound and which have a functionality >2.0 are particularly suitable. So-called lacquer isocyanates are especially suitable, for example those based on hexamethylene diisocyanate or on 1-isocyanato-3,5-trimethyl-5-isocyanatomethyl-cyclohexane (IPDI) and/or bis-(isocyanatocyclohexyl)-methane. Lacquer polyisocyanates based on these diisocyanates are the known derivatives of these diisocyanates containing biuret, urethane, uretdione and/or isocyanurate groups (U.S. Pat. Nos. 3,124,605, 3,358,010, 3,903,126, DE 1 022 789 and DE 1 222 067). Polyisocyanates containing carbodiimide groups (DE 1 092 007), polyisocyanates containing allophanate groups (GB 944 890), polyisocyanates containing urethane groups (U.S. Pat. No. 3,394,164) and prepolymeric or polymeric substances having at least two isocyanate groups may also be used.

Aromatic polyisocyanates based on 2,4-diisocyanatotoluene or mixtures thereof with 2,6-diisocyanatotoluene or based on 4,4-diisocyanatodiphenylmethane or mixtures thereof with its isomers and/or higher homologues are also suitable for the invention but are less preferred. Examples of such aromatic lacquer isocyanates include the isocyanates containing urethane groups which are obtainable by the reaction of 2,4-diisocyanatotoluene with polyhydric alcohols such as trimethylolpropane. Diisocyanato-isocyanurates are further examples of aromatic lacquer polyisocyanates.

The polyisocyanate component may consist of any mixtures of the polyisocyanates exemplified above.

The substances used as hydroxyl component B may be the polyols and mixtures of polyols known per se for the preparation of coating compounds based on polyurethanes. Polyester polyols, polyether polyols, polytriether polyols, OH group-containing acrylates, hydroxy acetates, hydroxy polycarbonates, polysaccharide derivatives, hydroxyl polyester amides, natural oils and derivatives of natural oils are particularly preferred. Low molecular weight polyols such as ethanediol or hexanediol amides may also be added.

Polyester polyols are particularly preferred, especially branched polyester polyols prepared by the condensation of polycarboxylic acids, preferably dicarboxylic acids such as isophthalic acid, phthalic acid, adipic acid, terephthalic acid, tetrahydrophthalic acid, succinic acid, hexahydrophthalic acid, maleic acid, fumaric acid, fatty acids, sebacic acid, trimellitic acid, or anhydrides thereof, and diols and polyols, such as ethylene glycols, 1,2-propanediol, 1,3-propanediol, 1,4-butanediol, 1,4-dimethylolcyclohexane, 1,6-hexanediol, diethylene glycol, triethylene glycol, tetraethylene glycol, 1,2,6-hexanetriol, glycerol, trimethylolpropane, trimethylolethane, pentaerythritol, mannitol, sorbitol and ethoxylation and propoxylation products thereof. Polyesters based on lactones can also be used, Natural oils such as castor oil and derivatives of natural oils such as ethoxylation products of natural trifatty acid glycerols are also particularly preferred.

Examples of the polyisocyanate and hydroxyl compounds to be used according to the invention are given e.g. in Polyurethane Handbook, Carl Hanser Verlag, Munich, 1985.

Suitable cellulose esters are in particular cellulose acetobutyrate, cellulose acetate, cellulose nitrate and mixed esters. Cellulose nitrate of all stages of viscosity having a nitrogen content of from 10.0 to 12.6% by weight is particularly preferred.

In a preferred embodiment, components A to C are used in the following proportions:

| Polyisocyanates A | 25-98 parts by weight, |
| in particular | 30-95 parts by weight, |
| Hydroxyl compounds B | 2-60 parts by weight, |
| in particular | 5-50 parts by weight, |
| Cellulose ester C | 0-50 parts by weight, |
| in particular | 3-30 parts by weight. |

The coating components are normally applied in solvents. Typical polyurethane solvents such as dimethylformamide, keto esters, hydrocarbons, glycol ether esters, ethers, esters, pyrrolidones or ketones may be used, e.g. toluene, xylene, ethyl acetate, butyl acetate, cyclohexanone, methyl ethyl ketone, acetone, isophorone or mixtures thereof.

The basic coating composition according to the invention may also contain other, conventional additives such as fillers, stabilizers, lubricants, anti-blocking agents, matting agents, adhesion promoters, Wetting agents, dispersing agents, levelling agents, defoamants, pigments, dyes and catalysts used in the usual quantities, either singly or as mixtures.

In the context of the present invention successful results can also be obtained using paraffins, Organometallic compounds in particular, such as organo zinc compounds, may be added to the lacquer component as catalysts in quantities of from 0.1 to 1%, calculated on the total quantity of binder.

Plasticizers conventionally used for lacquers may be added to the binder system according to the invention, e.g. esters of aliphatic, aromatic and cycloaliphatic carboxylic acids and inorganic acids. Plasticizers based on natural oils may also be used, e.g. epoxidized soya bean oil.

Resins may also be added, e.g. alkyd, maleic acid, phenol, formaldehyde, xylene, ketone, sulphonamide, amino, epoxy, carbamic acid, phenyl and acrylate resins.

Suitable methods of application include spraying, roller coating, application with doctor wipers, casting, brush coating, immersion and printing.

The polysaccharide products provided with the coating compounds according to the invention are suitable e.g. as biologically degradable packaging materials, in particular in the form of flat or tubular films, and as dustbin bags, carrier bags, mulch and silo films, articles of hygiene, the outer coverings of babies' nappies, transparent paper, carbon films and decorative materials.

The invention will now be further illustrated with the aid of the following Examples.

EXAMPLES

EXAMPLES 1-3

A coating was prepared on the basis of the components shown in the following Table and applied to both sides of the substrate in a thickness of 15 μm, using a coating knife. The substrate was a film of a mixture of cellulose hydrate and a polyether urethane according to DE-A 4 009 758.

TABLE 1

|  |  | 1 | 2 | 3 | Comparison Example 1 | Comparison Example 2 | Comparison Example 3 |
|---|---|---|---|---|---|---|---|
| Nitrocellulose, Standard AM 17* | (Pts. by wt.) | 4 | 4 | — | — | 4 | 4 |
| epoxidized soya bean oil | (Pts. by wt.) | 1 | 1 | — | — | 1 | 1 |
| Highly branched polyester[1] 8.8% by weight OH | (Pts. by wt.) | 7.5 | 2.5 | — | — | 9.2 | 5 |
| slightly branched polyester[2], 5.1% by wt. OH | (Pts. by wt.) | 2.5 | 2.5 | — | — | 5 | 5 |
| Castor oil, 5% OH | (Pts. by wt.) | — | — | 5 | — | — | — |
| Isocyanate resin[3], 17% by wt. NCO, based on HMDI | (Pts. by wt.) | 15 | 15 | — | — | 7.5 | 7.5 |
| Isocyanate resin, 4% NCO[4], based on IPDI | (Pts. by wt.) | — | — | 20 | — | — | — |
| Butyl acetate | (Pts. by wt.) | 80 | 60 | 30.5 | — | 54.8 | 50 |
| Xylene | (Pts. by wt.) | 40 | 40 | 40 | — | 40 | 40 |
| Paraffin, mp: 48-50° C. | (Pts. by wt.) | — | — | 0.5 | — | — | — |
| Solids content | (Pts. by wt.) | 20 | 20 | 24.5 | — | 20 | 20 |
| NCO:OH |  | 1:0.76 | 1:0.34 | 1:0.75 | — | 1:1.55 | 1:1 |
| Water resistance | (h) | 24 | 36 | 16 | 0.1 | 3 | 5 |

*DIN 53 179
[1] Desmophen 800 of Bayer Ag, Leverkusen
[2] Desmophen 1155 of Bayer Ag, Leverkusen
[3] Desmophen N of Bayer Ag, Leverkusen
[4] Desmophen E41 of Bayer Ag, Leverkusen Test for water resistance After 7 days' drying time at 20° C., these films were pulled over a metal edge to simulate the stresses occurring during processing. The resistance to water was then determined by means of the following experimental arrangement according to FIG. 1:

In FIG. 1 the numbers refer to the following components:
1. Glass plate 10×10 cm
2. Water-moist non-woven fabric
3. Coated substrate
4. Methylene blue powder The point in time at which the methylene blue powder began to be dissolved by the water forced through under pressure was determined. This moment of onset of solution is indicated by an intense blue colour. A water resistance of 12 hours is regarded as minimum requirement for use with moist media.

A water resistance of from 16–36 hours was achieved in the examples given.

The coated films were biologically degradable. They could be mineralised by the composting process.

COMPARISON EXAMPLE 1

A film was subjected to the water resistance test as in the Examples but this film was uncoated. It attained a water resistance value of only 0.1 h.

COMPARISON EXAMPLES 2-3

The film used in this case was treated with a coating compound having an NCO/OH ratio less than 1:0.85. The requirement for water resistance for use with moist media was not attainable.

What is claimed is:

1. A sheet, film or article molded of regenerated cellulose, or of a cellulose ester which swells in water, the molding optionally including a synthetic polymer, coated with a polyisocyanate.

2. A sheet, film or molded article according to claim 1, wherein the coating additionally includes a hydroxyl compound, the NCO:OH ratio in said coating being greater than 1:0.85.

3. A sheet, film or molded article according to claim 1, wherein the hydroxyl compound is a polyester polyol.

4. A sheet, film or molded particle according to claim 1, wherein the NCO:OH ratio in said coating is from 1:0.80 to 1:0.15.

5. A sheet, film or molded article according to claim 1, wherein the coating additionally contains a cellulose ester.

6. A sheet, film or molded article according to claim 1, wherein the coating contains from 25 to 98 parts by weight of polyisocyanate, from 2 to 60 parts by weight of a hydroxyl compound and from 0 to 50 parts by weight of a cellulose ester.

7. A sheet, film or molded article according to claim 1, wherein the coating comprises
 a) 3 to 50% by weight of cellulose ester,
 b) 25 to 98% by weight of polyisocyanate,
 c) 2 to 60% by weight of polyester polyol,
 d) 0 to 5% by weight of paraffins, and
 e) optionally other auxiliaries and additives.

8. A sheet, film or molded article according to claim 1, wherein the coating comprises
 a) 5 to 25% by weight of cellulose ester,
 b) 30 to 95% by weight of polyisocyanate,
 c) 5 to 50% by weight of polyester polyol,
 d) 0.2 to 3% by weight of paraffins, and
 e) optionally other auxiliaries and additives.

9. A coating composition, suitable for a sheet, film or article molded of regenerated cellulose, or of a cellulose ester which swells in water, comprising a polyisocyanate and a hydroxyl compound, the NCO:OH ratio in said composition being greater than 1:0.85.

10. A coating composition according to claim 9, additionally including a hydroxyl compound, the NCO:OH ratio in said composition being greater than 1:0.85.

11. A coating composition according to claim 9, wherein the NCO:OH ratio in said composition is from 1:0.80 to 1:0.15.

12. A coating composition according to claim 9, containing a cellulose ester.

13. A coating composition according to claim 9, wherein the composition contains from 25 to 98 parts by weight of polyisocyanate, from 2 to 60 parts by weight of a hydroxyl compound and from 0 to 50 parts by weight of a cellulose ester.

14. A coating composition according to claim 9, wherein the composition comprises
 a) 3 to 50% by weight of cellulose ester,
 b) 25 to 98% by weight of polyisocyanate,
 c) 2 to 60% by weight of polyester polyol,
 d) 0 to 5% by weight of paraffins, and
 e) optionally other auxiliaries and additives.

15. A coating composition according to claim 2, wherein the composition comprises
 a) 5 to 25% by weight of cellulose ester,
 b) 30 to 95% by weight of polyisocyanate,
 c) 5 to 50% by weight of polyester polyol,
 d) 0.2 to 3% by weight of paraffins, and
 e) optionally other auxiliaries and additives.

* * * * *

UNITED STATES PATENT AND TRADEMARK OFFICE
CERTIFICATE OF CORRECTION

PATENT NO : 5,352,730
DATED : October 4, 1994
INVENTOR(S): Erhard LUHMANN, et al.

It is certified that error appears in the above-identified patent and that said Letters Patent is hereby corrected as shown below:

Column 5, line 42,        cancel "particle" and substitute --article--.

Signed and Sealed this

Twenty-ninth Day of June, 1999

*Attest:*

*Attesting Officer*

Q. TODD DICKINSON

*Acting Commissioner of Patents and Trademarks*